United States Patent
Hosoi et al.

(10) Patent No.: US 8,717,438 B2
(45) Date of Patent: May 6, 2014

(54) PARKING ASSIST APPARATUS

(75) Inventors: Hiroyasu Hosoi, Okazaki (JP); Noboru Nagamine, Anjo (JP); Koichiro Honda, Nagoya (JP); Keigo Ikeda, Toyota (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 391 days.

(21) Appl. No.: 13/073,487

(22) Filed: Mar. 28, 2011

(65) Prior Publication Data
US 2011/0292079 A1    Dec. 1, 2011

(30) Foreign Application Priority Data
May 26, 2010  (JP) ................................ 2010-120759

(51) Int. Cl.
*G09G 5/00* (2006.01)

(52) U.S. Cl.
USPC ........... 348/148; 701/41; 340/436; 340/932.2

(58) Field of Classification Search
None
See application file for complete search history.

(56) References Cited

U.S. PATENT DOCUMENTS

| | | | |
|---|---|---|---|
| 6,540,365 B1 * | 4/2003 | Fujiwara et al. | 353/69 |
| 2001/0027363 A1 * | 10/2001 | Shimazaki et al. | 701/41 |
| 2002/0005779 A1 * | 1/2002 | Ishii et al. | 340/436 |
| 2002/0041239 A1 | 4/2002 | Shimizu et al. | |
| 2004/0119610 A1 * | 6/2004 | Maemura et al. | 340/932.2 |
| 2010/0070139 A1 | 3/2010 | Ohshima et al. | |

FOREIGN PATENT DOCUMENTS

| | | | | |
|---|---|---|---|---|
| JP | 05270432 A | * | 10/1993 | B62D 15/02 |
| JP | 11-157404 | | 6/1999 | |
| JP | 2000-072019 A | | 3/2000 | |
| JP | 2002-036991 A | | 2/2002 | |
| JP | 2003-048500 A | | 2/2003 | |
| JP | 3575279 B2 | | 10/2004 | |
| JP | 2007-176256 A | | 7/2007 | |
| JP | 2008-137557 A | | 6/2008 | |
| JP | 2008-257502 A | | 10/2008 | |
| JP | 2010-069916 A | | 4/2010 | |

OTHER PUBLICATIONS

English Machine Translation of (JP 05270432 A).*
Japanese Office Action dated Jan. 7, 2014 in Japanese Patent Application No. 2010-120759.

* cited by examiner

*Primary Examiner* — Behrooz Senfi
*Assistant Examiner* — Mohammed Jebari
(74) *Attorney, Agent, or Firm* — Sughrue Mion, PLLC

(57) ABSTRACT

A parking assist apparatus includes a display portion mounted at a vehicle and displaying a parking assist image in which an estimated course line generated in association with an operation of a steering wheel is superimposed on a captured image of a surrounding of the vehicle, and an auxiliary image controlling portion displaying an auxiliary image in place of the parking assist image in a state where the parking assist image is displayed on the display portion, the auxiliary image including a virtual vehicle representing the vehicle and a virtual estimated course line corresponding to the estimated course line for the virtual vehicle.

16 Claims, 10 Drawing Sheets

F I G. 1
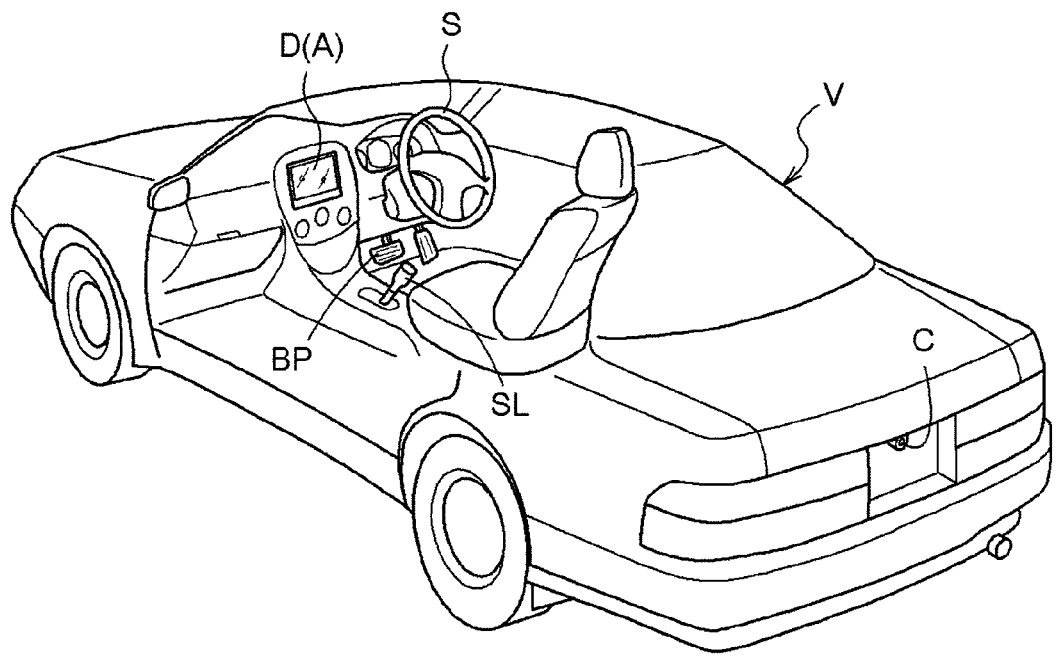

PARKING ASSIST APPARATUS

CROSS REFERENCE TO RELATED APPLICATIONS

This application is based on and claims priority under 35 U.S.C. §119 to Japanese Patent Application 2010-120759, filed on May 26, 2010, the entire content of which is incorporated herein by reference.

TECHNICAL FIELD

This disclosure relates to a parking assist apparatus.

BACKGROUND DISCUSSION

A known parking assist apparatus mounted at a vehicle displays a parking assist image in which an estimated course line of the vehicle that is generated in association with an operation of a steering wheel is superimposed on an image of a surrounding of the vehicle captured by a camera. Such parking assist apparatus is disclosed in JP3575279A. According to the parking assist apparatus disclosed in JP3575279A, an image in the rear of the vehicle captured and detected by the camera is displayed as a rearward image on a display device that is provided at an interior of the vehicle. In addition, a steering sensor is provided at the vehicle so as to detect a steering angle to thereby obtain an estimated driving locus (estimated course line) of the vehicle based on the detected steering angle by the steering sensor. As a result, a pair of estimated driving locus lines is displayed on the display device. A distance between the pair of estimated locus lines corresponds to a width of the vehicle.

Accordingly, because the estimated driving locus lines generated in response to the steering angle are displayed on the display device in the interior of the vehicle, a driver for the vehicle confirms an estimated course of the vehicle at a time of a rearward parking of the vehicle, and the like.

However, even when the aforementioned parking assist apparatus is used, an effect thereof may not be exercised unless the driver understands the meaning of the estimated driving locus lines displayed on the display device.

A need thus exists for a parking assist apparatus which is not susceptible to the drawback mentioned above.

SUMMARY

According to an aspect of this disclosure, a parking assist apparatus includes a display portion mounted at a vehicle and displaying a parking assist image in which an estimated course line generated in association with an operation of a steering wheel is superimposed on a captured image of a surrounding of the vehicle, and an auxiliary image controlling portion displaying an auxiliary image in place of the parking assist image in a state where the parking assist image is displayed on the display portion, the auxiliary image including a virtual vehicle representing the vehicle and a virtual estimated course line corresponding to the estimated course line for the virtual vehicle.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view of a vehicle at which a parking assist apparatus according to a first embodiment is mounted;

DETAILED DESCRIPTION

A first embodiment will be explained with reference to the attached drawings. FIG. 1 is a perspective view of a vehicle V at which a parking assist apparatus A according to the first embodiment is mounted. In the first embodiment and following second and third embodiments which will be explained later, directions and orientations such as left, right, front, rear, top, and bottom correspond to those of the vehicle V. As illustrated in FIG. 1, a camera C is attached to a rear portion of the vehicle V so as to capture an image in the rear of the vehicle V. The camera C is positioned above a rear license plate of the vehicle V and arranged at an offset position in a width direction (i.e., a left and right direction) of the vehicle V relative to a center axis thereof. An optical axis of the camera C faces downward, for example, 30 degrees downward from a horizontal plane. The camera C includes wide-angle lenses having a view angle of 110 to 120 degrees, for example, so as to capture the image of an approximately 8 meters area in the rear of the vehicle V. According to the present embodiment, the camera C is a digital camera incorporating an imaging device such as a CCD (charge coupled device) and a CIS (CMOS image sensor) to thereby capture a two-dimensional image (2-D image) at 15 to 30 frames per second. The 2-D image captured by the camera C is digitally converted and then output as motion picture data.

In addition, as illustrated in FIG. 1, a display D, a steering wheel S, a brake pedal BP, and a shift lever SL are provided in an interior of the vehicle V.

Figure 2:
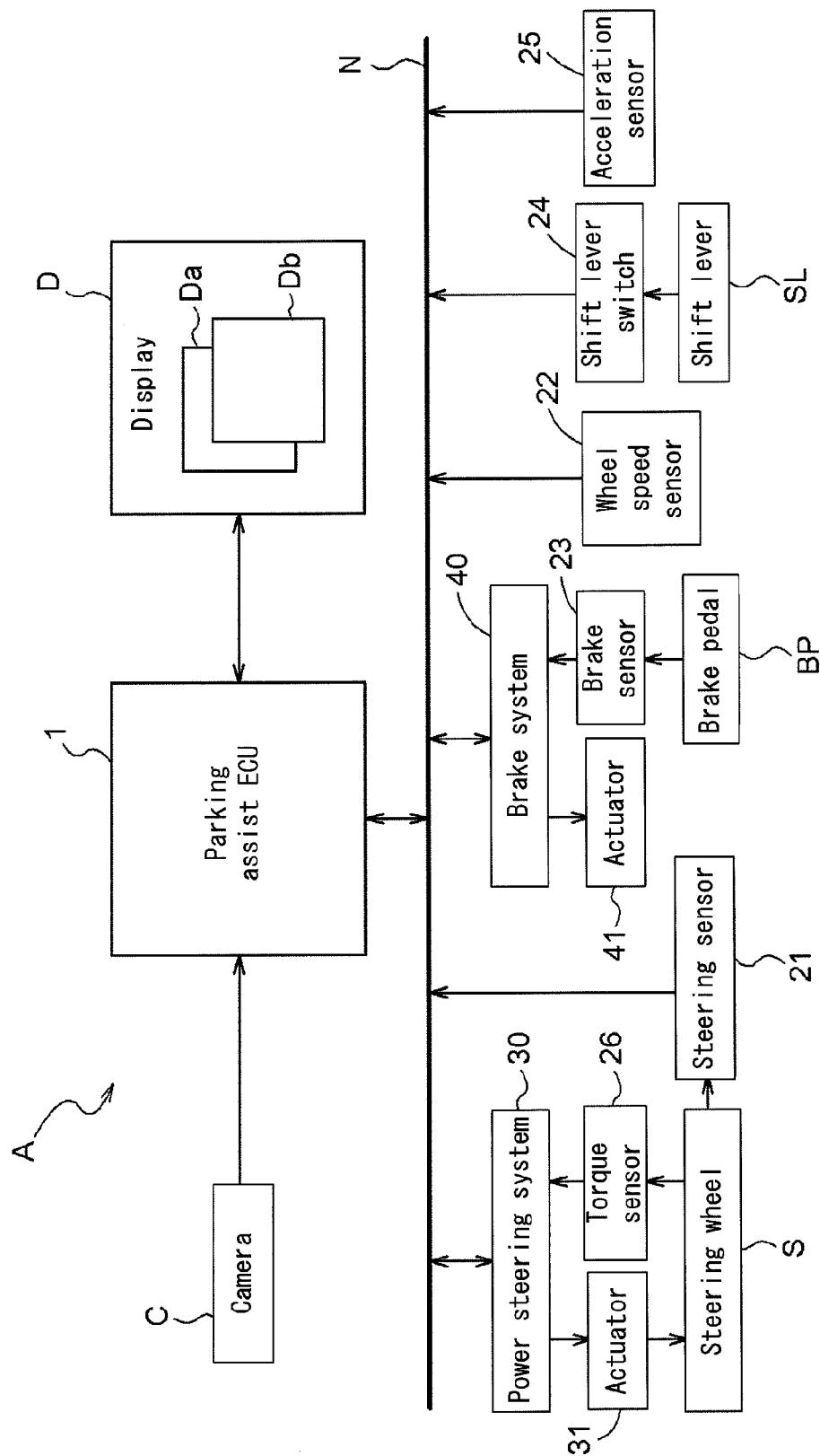
FIG. 2 is a system configuration diagram of the parking assist apparatus according to the first embodiment.

According to the present embodiment, the display D also functions as a monitor device for a navigation system. Therefore, the display D includes a display portion Da and a touch panel Db formed on the display portion Da as illustrated in FIG. 2. The display portion Da is constituted by a liquid crystal display, for example. The touch panel Db, which is formed together with the display portion Da, is constituted by an instruction input device of a pressure-sensitive type or an electrostatic type, for example, so as to output a contact position by a finger, and the like as location data.

FIG. 2 is a system configuration diagram of the parking assist apparatus A of the present embodiment. The parking assist apparatus A according to the present embodiment includes a parking assist ECU (electronic control unit) 1 having a CPU (central processing unit) as a core, a memory, and a peripheral circuit. In this case, instead of the CPU, the other logic operation processor or logic circuit such as a DSP (digital signal processor) may be used as the core.

An image around the vehicle V captured by the camera C is sent and input to the parking assist ECU 1. The parking assist apparatus A guides the vehicle V to a parking position that is instructed or specified by a driver of the vehicle V at a time of a rearward parking or a parallel parking, or a parking position that is automatically specified by the parking assist apparatus A and confirmed by the driver. Specifically, a steering angle of the steering wheel S that is operated by the driver is detected. Then, an estimated course of the vehicle V based on the detected steering angle is displayed in a superimposed manner on the image captured by the camera C.

The parking assist ECU 1 is connected to various systems and sensors so as to be communicable thereto via an in-vehicle network N (hereinafter simply referred to as a network N). A CAN (controller area network) is used as the network N, for example. As illustrated in FIG. 2, the parking assist apparatus A is connected to a power steering system 30, a brake system 40, and the like. Each of such systems includes an ECU having an electronic circuit such as the CPU as the core, the peripheral circuit, and the like, in the same way as the parking assist apparatus A.

The power steering system 30 is an electric power steering (EPS) system or a steer-by-wire (SBW) system, for example. The power steering system 30 not only adds an assist torque via an actuator 31 to the steering wheel S operated by the driver but also performs an automatic steering operation by driving the steering wheel S or wheels by the actuator 31.

The brake system 40 is an electric brake system, a brake-by-wire (BBW) system, or the like including an anti-lock braking system (ABS) for restraining a brake locking, an electronic stability control (ESC) for restraining a skidding of the vehicle V when the vehicle V is driven at a corner, and a brake assist for increasing a braking force, for example. The brake system 40 applies the braking force to the vehicle V via an actuator 41.

As illustrated in FIG. 2, a steering sensor 21, a wheel speed sensor 22, a shift lever switch 24, and an acceleration sensor 25 are connected to the network N. The steering sensor 21 detects a steering angle (i.e., a rotation angle) of the steering wheel S. For example, the steering sensor 21 is constituted by a Hall element. The parking assist apparatus A obtains the steering angle of the steering wheel S by the driver and/or a steering amount of the steering wheel S at a time of the automatic steering operation from the steering sensor 21 so as to perform various controls.

The wheel speed sensor 22 detects a rotation amount of each of the wheels of the vehicle V or the number of rotations thereof per unit time. For example, the wheel speed sensor 22 is constituted by a Hall element. The parking assist apparatus A calculates a moving amount of the vehicle V, and the like, based on information obtained by the wheel speed sensor 22 to thereby perform various controls. The wheel speed sensor 22 may be provided at the brake system 40. The brake system 40 detects the brake locking, a spin of the wheel, a possibility of skidding, and the like based on a rotation difference between the left and right wheels, for example, to thereby perform the various controls. In a case where the wheel speed sensor 22 is provided at the brake system 40, the parking assist apparatus A obtains information about the wheel via the brake system 40. The brake sensor 23 detects an operation amount of the brake pedal BP and obtains information thereof via the brake system 40. The parking assist apparatus A controls the automatic steering operation to be halted or stopped because the present circumstances are not suitable for the automatic steering in a case where the brake pedal BP is depressed during the automatic steering operation, for example.

The shift lever switch 24 is a sensor or a switch detecting a position of the shift lever SL. The shift lever switch 24 includes a displacement sensor, for example. In a case where the shift lever SL is positioned in a reverse range, for example, the parking assist apparatus A starts an assist control and stops the assist control when the shift lever SL is shifted from the reverse range to a forward driving range.

A torque sensor 26 that detects an operation torque applied to the steering wheel S also detects whether or not the driver grips or holds the steering wheel S. The parking assist apparatus A controls the automatic steering operation to be halted or stopped because the present circumstances are not suitable for the automatic steering in a case where the steering wheel S is strongly gripped or held by the driver during the automatic steering so that the driver intends to operate the steering wheel S. At a time of the automatic steering operation, an engine creep of the vehicle V caused by an idling of the engine is generally utilized. Thus, in a case where the acceleration sensor 25 detects the operation of an acceleration pedal by the driver, the parking assist apparatus A controls the automatic steering operation to be halted or stopped because the present circumstances are not suitable for the automatic steering.

The systems, sensors, and connection states thereof illustrated in FIG. 2 are examples and may be modified appropriately. In addition, the sensors may be directly connected to the network N or indirectly connected thereto via the various systems.

Figure 3:
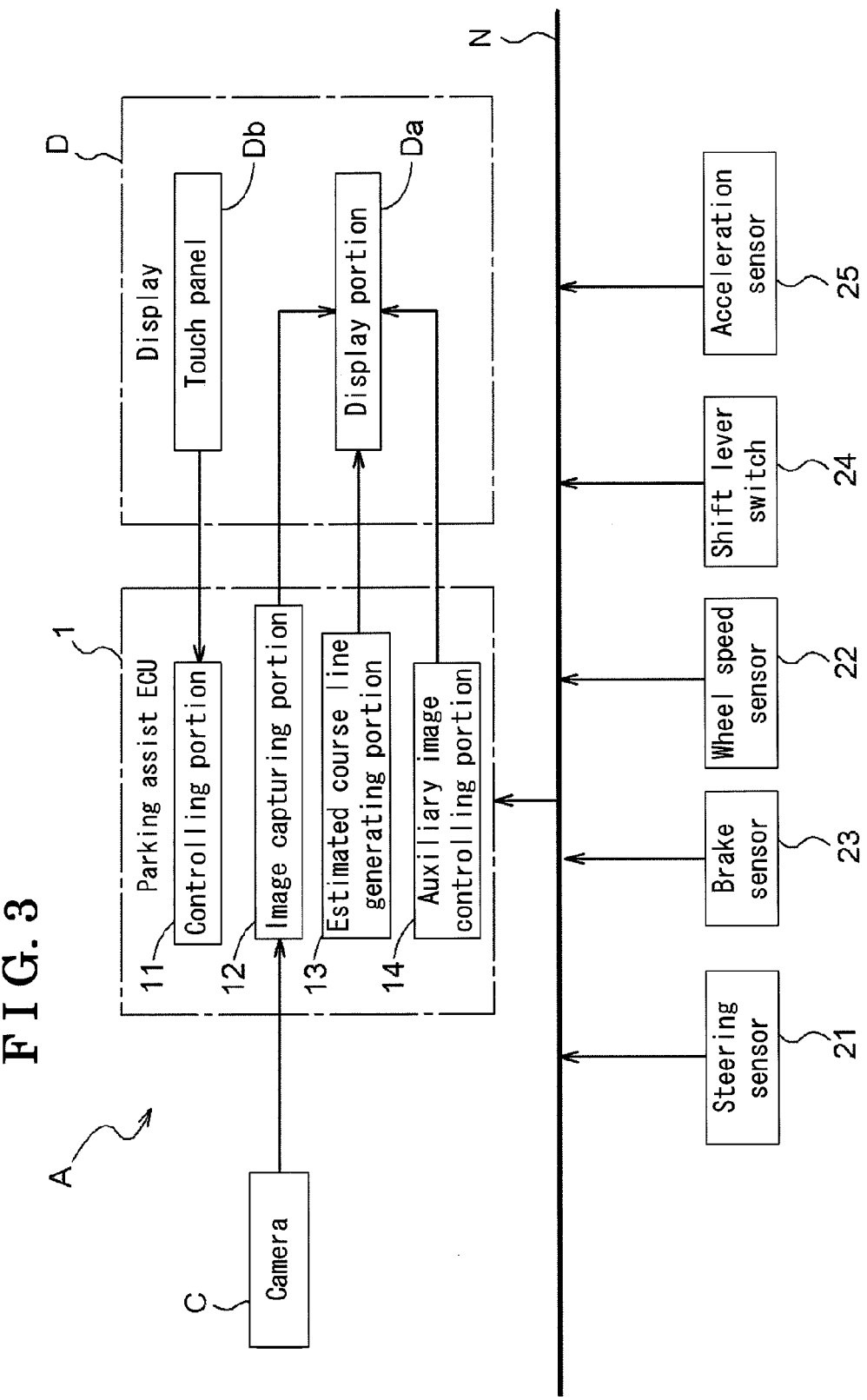
FIG. 3 is a functional block diagram of a parking assist ECU mounted at the parking assist apparatus according to the first embodiment.

FIG. 3 is a functional block diagram of the parking assist ECU 1. As illustrated in FIG. 3, the parking assist ECU 1 of the present embodiment includes a controlling portion 11 controlling the parking assist ECU 1 as a whole, an image capturing portion 12 obtaining the image captured by the camera C, an estimated course line generating portion 13 generating estimated course lines of the vehicle V based on signals from the various sensors, and an auxiliary image controlling portion 14.

The controlling portion 11 entirely controls the parking assist apparatus A. For example, the controlling portion 11 obtains an output signal from each of the sensors, gives an instruction to each functional portion, and the like.

The image capturing portion 12 obtains a frame image captured by the camera C and stores the captured frame image at a frame memory.

The estimated course line generating portion 13 generates various indexes including the estimated course lines that indicate an estimated course of the vehicle V based on the signals or inputs from the steering sensor 21, the wheel speed sensor 22, the brake sensor 23, the shift lever switch 24, the acceleration sensor 25, and the like.

The auxiliary image controlling portion 14 includes a function to display an auxiliary image (which will be explained later in detail) at the display portion Da.

Figure 4:
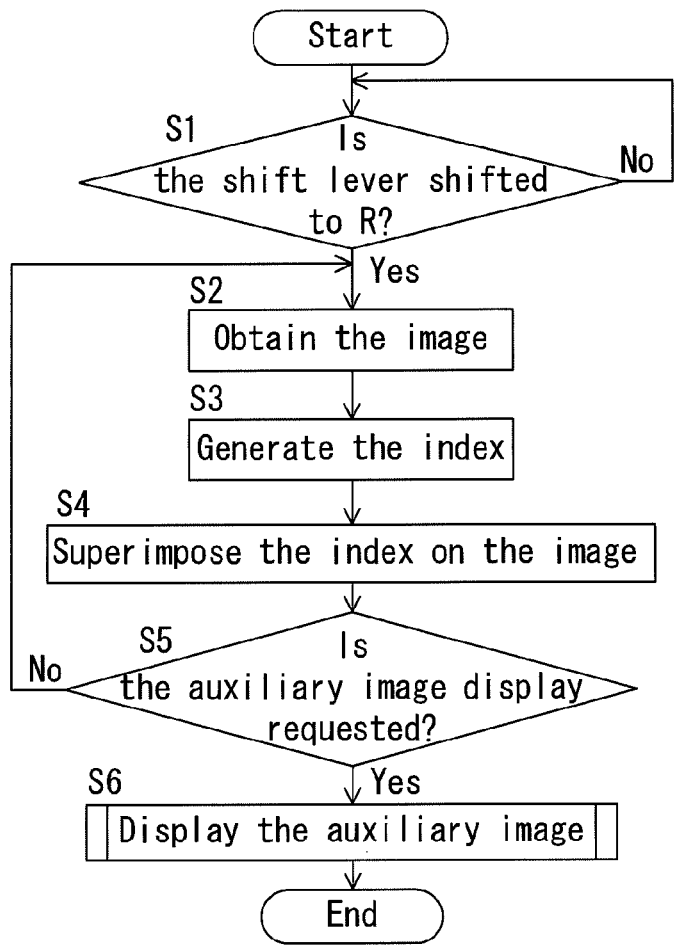
FIG. 4 is a flowchart illustrating an operation performed by the parking assist apparatus according to the first embodiment.

Next, a process flow of the parking assist apparatus A according to the present embodiment will be explained by a flowchart illustrated in FIG. 4. The controlling portion 11 monitors a start of a parking assist operation. Specifically, in a case where it is detected that the shift lever SL is shifted to the reverse range (R) in S1 based on an input from the shift lever switch 24, the controlling portion 11 gives an instruction to each function portion so as to start the parking assist operation.

The image capturing portion 12 obtains the frame image captured by the camera C as mentioned above in S2. In addition, the estimated course line generating portion 13 generates the various indexes based on the input from each of the various sensors as mentioned above in S3. The image obtained by the image capturing portion 12 and the various indexes generated by the estimated course line generating portion 13 are displayed in a superimposed manner on the display portion Da in S4. The image displayed in the aforementioned manner will be hereinafter referred to as a parking assist image.

Figure 5:
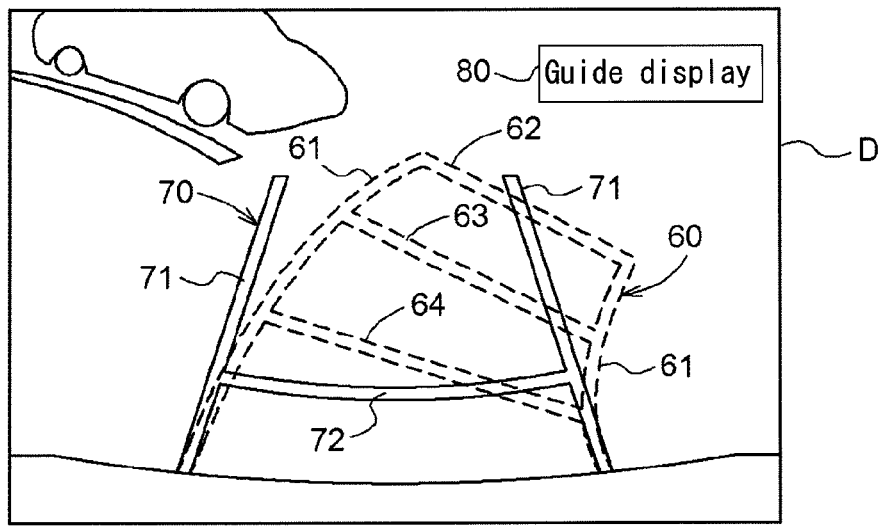
FIG. 5 is an example of a parking assist image according to the first embodiment.

FIG. 5 illustrates an example of the parking assist image. The parking assist image in FIG. 5 includes an expected rearward line 60 serving as an estimated course line and a vehicle rearward line 70. The expected rearward line 60 is an index indicating an expected locus of a rear end of the vehicle V, and the like, based on the steering angle of the steering wheel S of the vehicle V when the vehicle V is driven rearward. The vehicle rearward line 70 is an index indicating a predetermined position in the rear of the vehicle V regardless of the steering angle of the steering wheel S.

The expected rearward line 60 in FIG. 5 includes expected rear end locus lines 61 (複数) and distance estimation lines 62, 63, and 64 in the rear of the vehicle V. In the parking assist image in FIG. 5, the distance estimation lines 62 to 64 specifically correspond to a 5-meter estimation line, a 3-meter estimation line, and a 1-meter attention line, respectively, from the rear end of the vehicle V. The vehicle rearward line 70 in FIG. 5 includes vehicle width extension lines 71 indicating the width of the vehicle V and a 1-meter estimation line 72 serving as the distance estimation line.

The driver of the vehicle V understands, by means of the parking assist image, how the vehicle V moves when the vehicle V is driven rearward. The parking assist image may be a driving assist at a time of rearward parking accordingly.

However, a driver who sees the parking assist image for the first time might not understand what the various indexes in the parking assist image mean. In such case, an effect of the parking assist apparatus may not be sufficiently exercised.

In such case, according to the parking assist apparatus of the present embodiment, an auxiliary image is displayed so that the driver understands the meaning of the various indexes, particularly, the expected rearward line 60. In the embodiment, the auxiliary image is displayed on the display portion Da when a guide display button 80 (see FIG. 5) indicated together with the parking assist image is pressed.

Specifically, in a case where the parking assist image is displayed on the display portion Da, the controlling portion 11 monitors a pressing of the guide display button 80 that is caused by an operation of the touch panel Db by the driver (i.e., a predetermined operation). When it is detected that the guide display button 80 is depressed in S5 (i.e., the display of the auxiliary image is requested), the controlling portion 11 gives an instruction to the auxiliary image controlling portion 14 to display the auxiliary image. Then, the auxiliary image controlling portion 14 displays the auxiliary image on the display portion Da in place of the parking assist image in S6.

Figure 6:
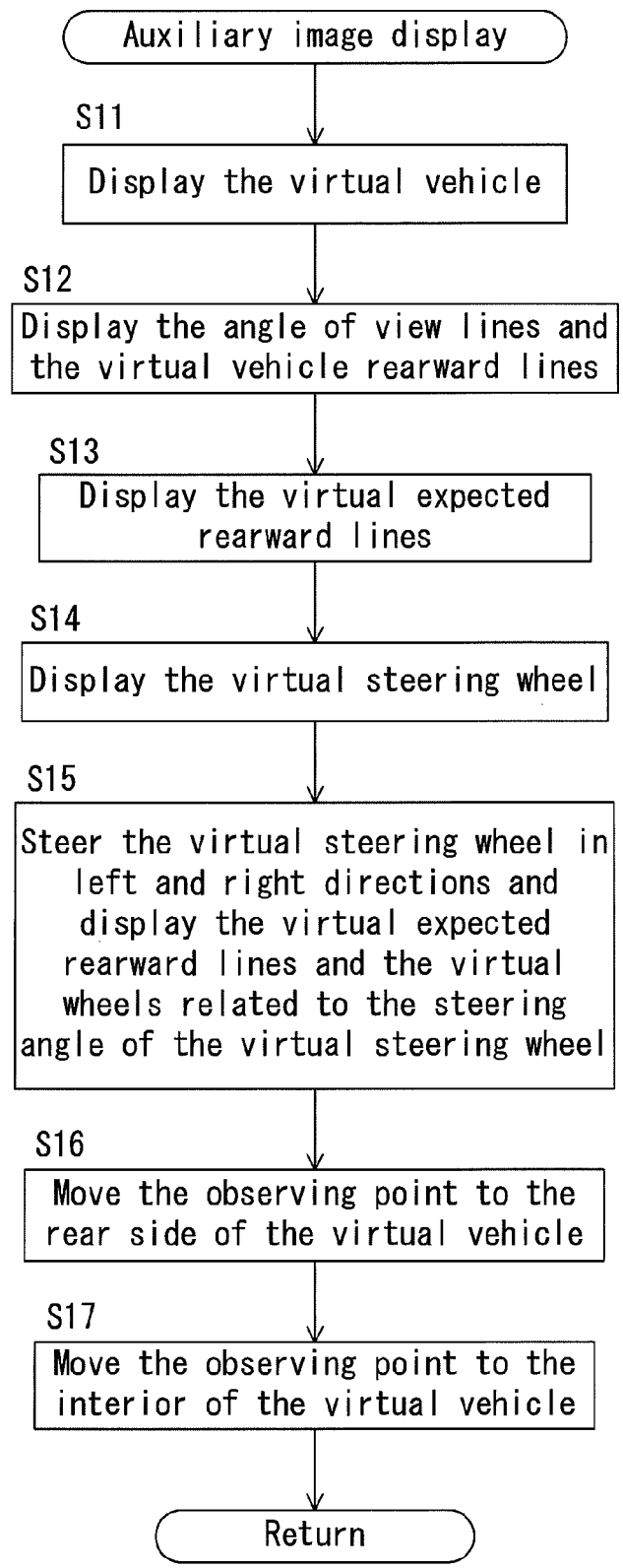
FIG. 6 is a flowchart illustrating an auxiliary image display operation according to the first embodiment.

FIG. 6 is a flowchart illustrating an auxiliary image display operation. FIGS. 7A, 7B, 7C, 7D, 7E, 7F, 7G, 7H, and 7I are characteristic frame images among the multiple frame images constituting the auxiliary image. In practice, the auxiliary image is indicated as a motion picture.

Figure 7A:
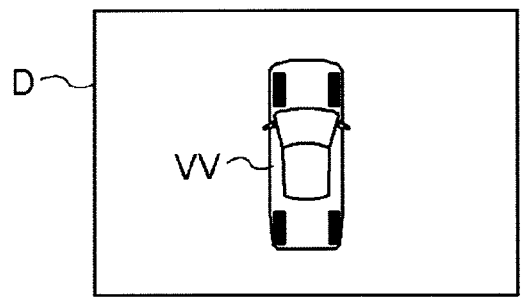
FIGS. 7A, 7B, 7C, 7D, 7E, 7F, 7G, 7H and 7I are characteristic frame images among multiple frame images according to the first embodiment.
Figure 7B:
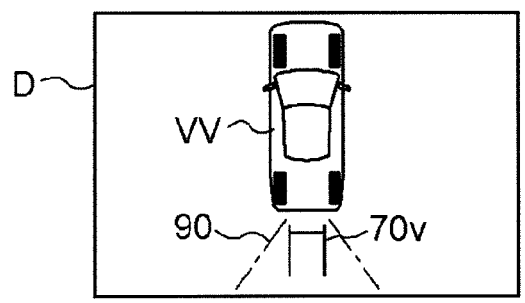
Figure 7C:
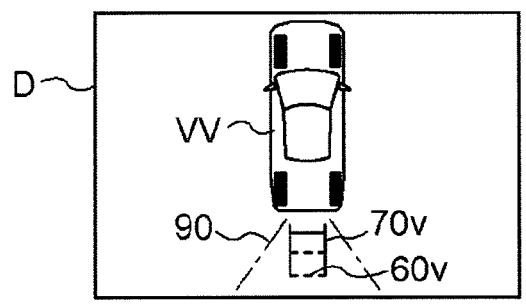

As illustrated in FIG. 7A, an image where the vehicle V is viewed from an upper side thereof is displayed in S11. The vehicle V indicated on the auxiliary image will be hereinafter referred to as a virtual vehicle VV. Then, an angle of view lines 90 indicating an angle of view of the camera C virtually mounted at the virtual vehicle VV, and a virtual vehicle rearward line 70v, which corresponds to the vehicle rearward line 70 for the vehicle V, are displayed in S12 as illustrated in FIG. 7B. Further, a virtual expected rearward line 60v serving as a virtual estimated course line, which corresponds to the expected rearward line 60 for the vehicle V, is displayed in S13 as illustrated in FIG. 7C. At this time, the steering angle of the steering wheel for the virtual vehicle VV, i.e., a virtual steering wheel VS, is assumed to be equal to zero degrees so that the virtual vehicle VV faces straight ahead. Thus, the virtual expected rearward line 60v matches the virtual vehicle rearward line 70v. In a case where a color display of the display portion Da is available, an area of field of view inside the angle of view lines 90 may be desirably colored in yellow, for example.

Figure 7D:
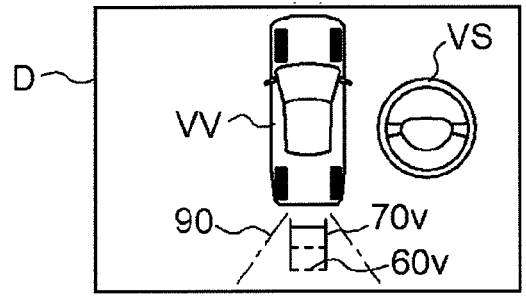
Figure 7E:
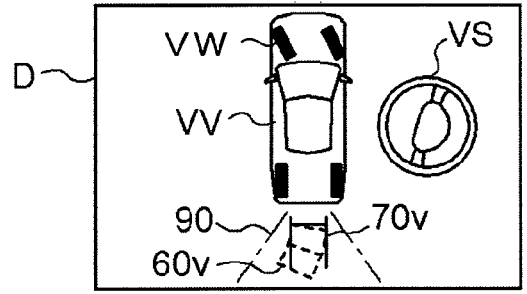
Figure 7F:
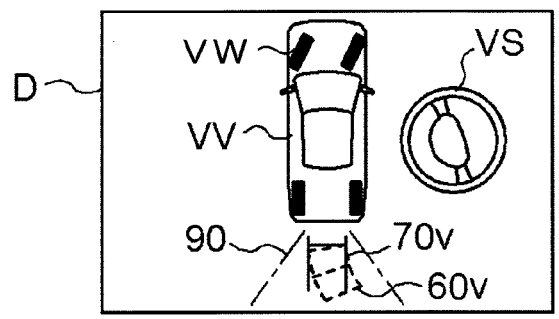

Next, the auxiliary image controlling portion 14 causes the virtual steering wheel VS to be displayed on the auxiliary image in S14 as illustrated in FIG. 7D. The auxiliary image controlling portion 14 then causes the virtual steering wheel VS that is displayed on the auxiliary image to turn in a leftward direction (i.e., in a counterclockwise direction) and thereafter to turn in a rightward direction (i.e., in a clockwise direction) in S15 as illustrated in FIGS. 7E and 7F. That is, the auxiliary image controlling portion 14 controls the display on the display portion Da as if the virtual steering wheel VS is steered. At this time, the display of the virtual expected rearward line 60v is changed in response to the rotational angle (the steering angle) of the virtual steering wheel VS as illustrated in FIGS. 7E and 7F. The driver who sees the virtual steering wheel VS and the virtual expected rearward line 60v recognizes that the expected rearward line 60 is related to the steering angle of the steering wheel S.

As illustrated in FIGS. 7E and 7F, virtual wheels are provided at the virtual vehicle VV (which will be hereinafter referred to as virtual wheels VW serving as virtual front wheels). The virtual wheels VW are operated in association with the steering angle of the virtual steering wheel VS. Thus, the driver understands that the virtual wheels VW (specifically, the front wheels) and the virtual expected rearward line 60v change in association with the steering angle of the virtual steering wheel VS. As a result, the meaning of the expected rearward line 60 is more understandable by the driver.

Figure 7G:
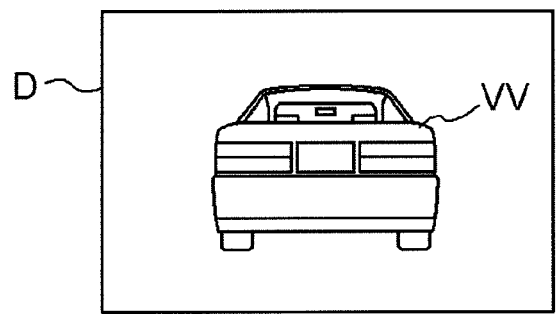
Figure 7H:
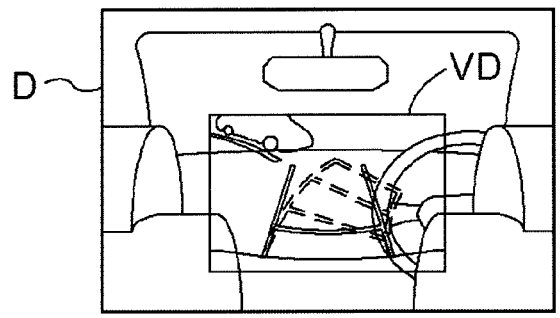
Figure 7I:
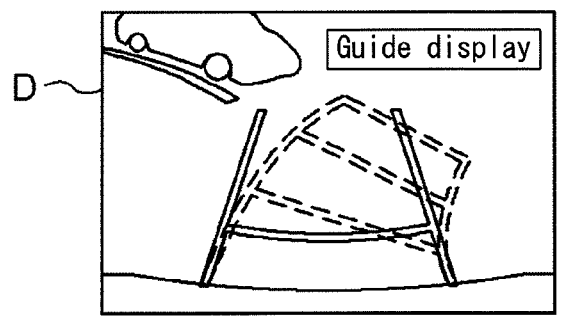

Afterwards, an observing point is changed from the upper side of the virtual vehicle VV to an obliquely rear side thereof in S16 as illustrated in FIG. 7G. The observing point then moves to the interior of the virtual vehicle VV so as to zoom in a virtual display VD mounted in the interior of the virtual vehicle VV in S17 as illustrated in FIG. 7H. At this time, the parking assist image is displayed on the display portion Da of the virtual display VD. Thus, the parking assist image is finally displayed on the display portion Da as illustrated in FIG. 7I. Accordingly, a switching from the auxiliary image to the parking assist image is seamlessly conducted.

While the auxiliary image is being displayed, the controlling portion 11 is monitoring a signal from the brake sensor 23, the wheel speed sensor 22, or the like, which is not shown in the flowchart in FIG. 6. In a case where the movement of the vehicle V is detected on a basis of the input from any of the sensors, the controlling portion 11 cancels the display of the auxiliary image and displays the parking assist image on the display portion Da. Accordingly, in a case where the vehicle V is shifted to the parking operation while the auxiliary image is being displayed, the display image is changed to the parking assist image from the auxiliary image, thereby securely performing the parking assist operation.

Figure 8:
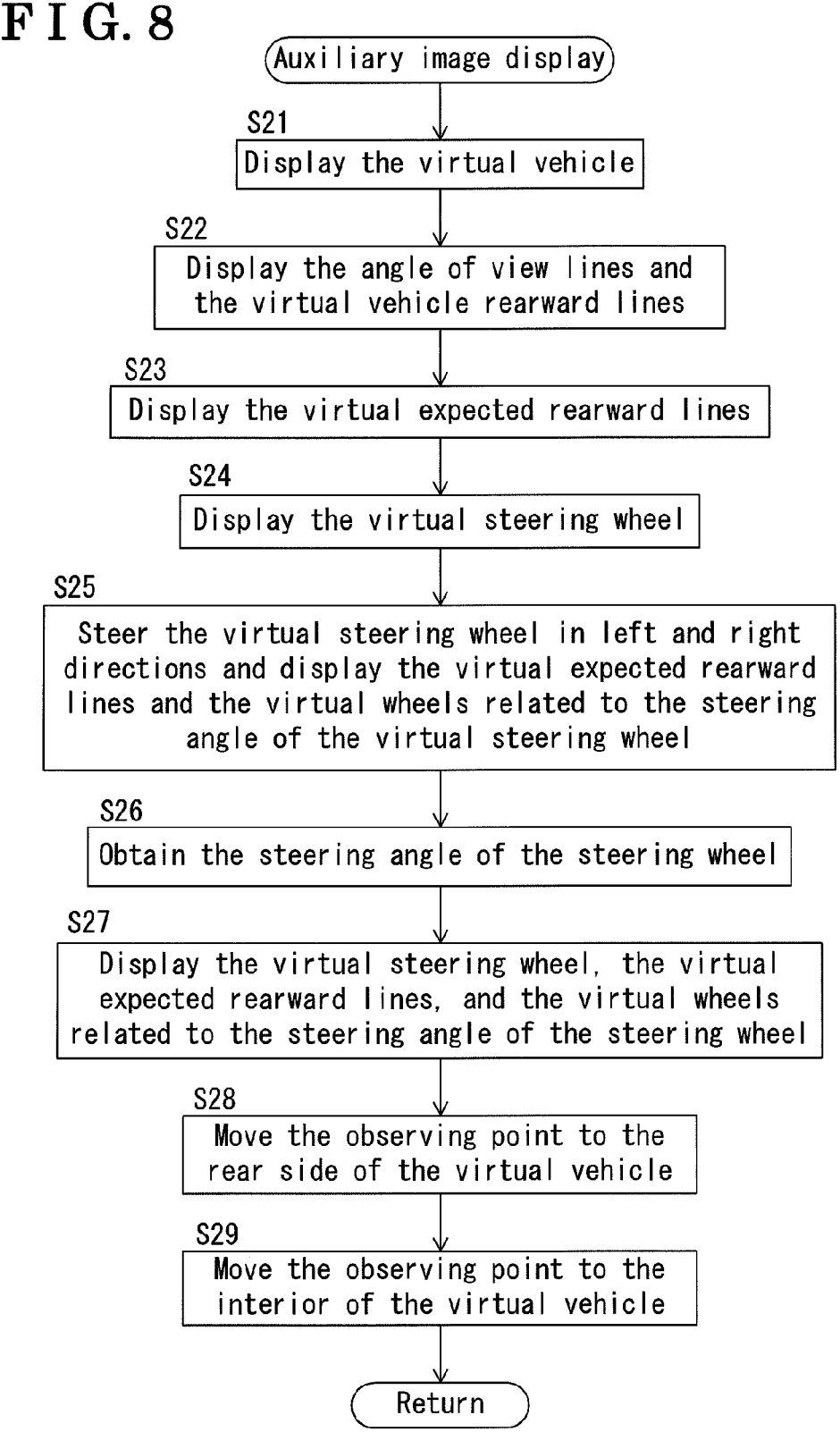
FIG. 8 is a flowchart illustrating the auxiliary image display operation according to a second embodiment.

A second embodiment will be explained with reference to FIG. 8. FIG. 8 illustrates a flow of the auxiliary image display operation according to the second embodiment. Operations from S21 to S25 in FIG. 8 are the same as operations in S11 to S15 in FIG. 6 according to the first embodiment and thus an explanation will be omitted. In addition, a functional block is the same as that of the first embodiment and therefore an explanation will be omitted.

The second embodiment is different from the first embodiment in an operation after the virtual steering wheel VS is steered in the left and right directions. When the auxiliary image controlling portion 14 completes the operations up to S25, the auxiliary image controlling portion 14 obtains a steering angle θ of the steering wheel S of the actual vehicle V by the steering sensor 21 in S26. Further, the auxiliary image controlling portion 14 changes the steering angle of the virtual steering wheel VS to be equal to the steering angle θ and controls the virtual wheels VW and the virtual expected rearward line 60v to follow the change of the steering angle of the virtual steering wheel VS in S27. Afterwards, the observing point is moved to the rear side of the virtual vehicle W and to the virtual display VD in S28 and S29 as in the same way as S16 and S17 in FIG. 6. In the aforementioned display state, the virtual expected rearward line 60v (see FIG. 7H) displayed on the virtual display VD match the expected rearward line 60 (see FIG. 7I) in the parking assist image that is finally displayed on the display portion Da.

According to the second embodiment, the steering angle of the virtual steering wheel VS at a time when the auxiliary image is finished matches the actual steering angle of the steering wheel S. Thus, an uncomfortable feeling caused by the switching from the auxiliary image to the parking assist image is reduced. In addition, the driver who sees the auxiliary image understands the meaning of the estimated course line.

Figure 9:
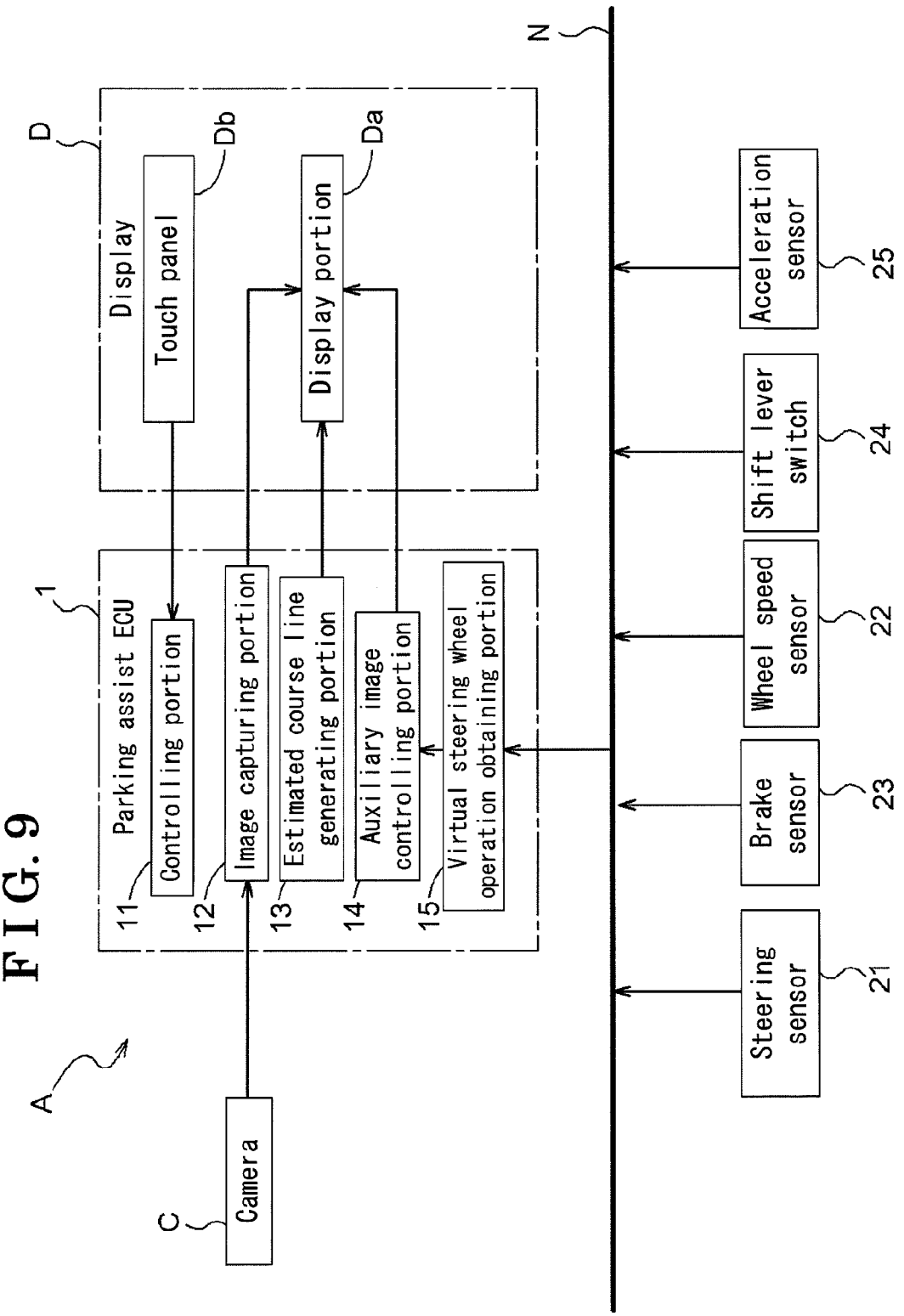
FIG. 9 is a functional block diagram of the parking assist ECU mounted at the parking assist apparatus according to a third embodiment.
Figure 10:
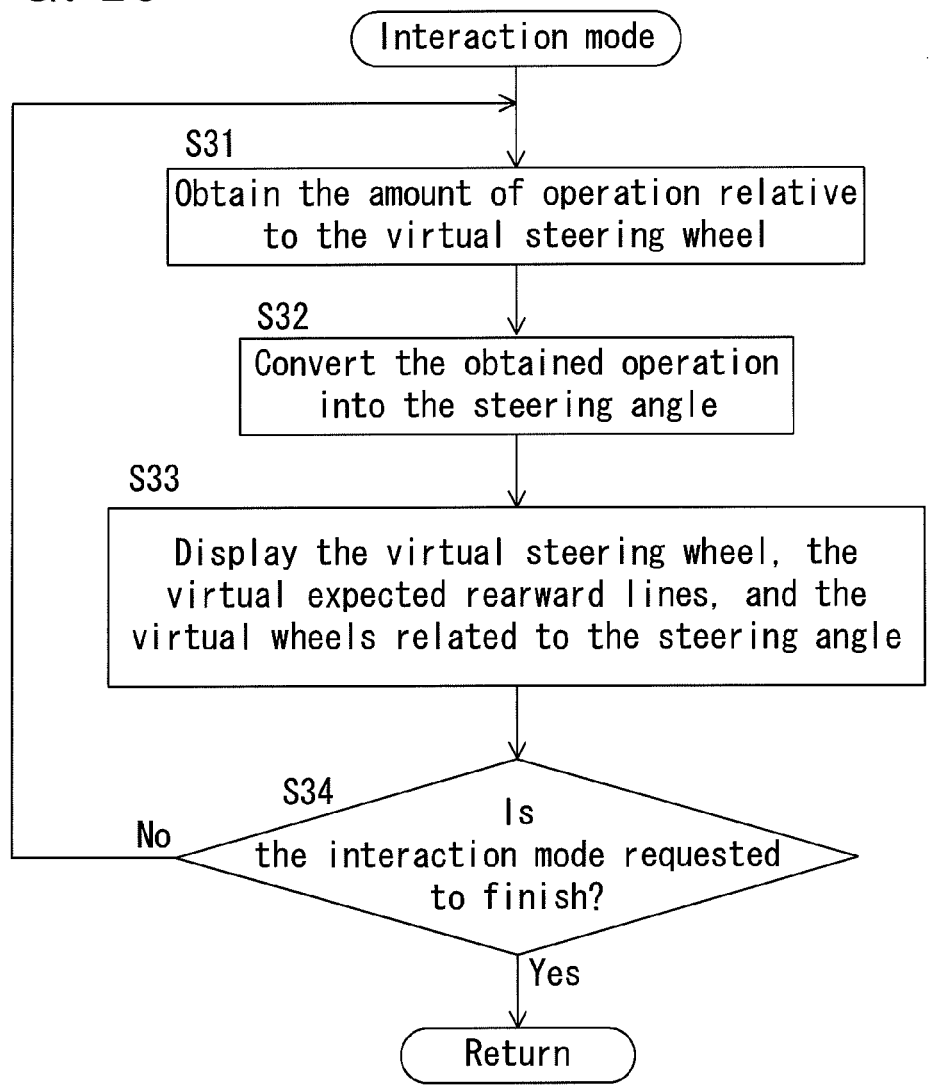
FIG. 10 is a flowchart illustrating an operation in an interaction mode of the auxiliary image display operation according to the third embodiment.

A third embodiment will be explained with reference to FIGS. 9 and 10. FIG. 9 is the functional block diagram of the parking assist ECU 1 of the third embodiment. The third embodiment is different from the first embodiment in that the third embodiment includes a virtual steering wheel operation obtaining portion 15 for obtaining an amount of operation relative to the virtual steering wheel VS.

In the first and second embodiments, the steering angle of the virtual steering wheel VS is controlled by the auxiliary image controlling portion 14. In the third embodiment, the amount of operation relative to the virtual steering wheel VS (i.e., the steering angle of the virtual steering wheel VS) is input by the driver via the virtual steering wheel operation obtaining portion 15. Thus, the operation in the third embodiment is called an interaction mode.

A detailed operation of the interaction mode will be explained with reference to FIG. 10. The interaction mode is started or triggered at any timing while the auxiliary image is being displayed. For example, in a case where the driver requests the start of the interaction mode, after the steering angle of the virtual steering wheel VS is changed in the left and right directions (after S15 in FIG. 6), and the like.

When the interaction mode is started, the auxiliary image controlling portion 14 obtains the amount of operation relative to the virtual steering wheel VS (i.e., the steering angle of the virtual steering wheel VS) from the driver in S31. According to the present embodiment, the virtual steering wheel operation obtaining portion 15 obtains the amount of operation relative to the virtual steering wheel VS based on the operation to the touch panel Db. Thus, when the driver slides his/her finger or the like on the virtual steering wheel VS displayed on the display portion Da, the sliding amount and direction of his/her finger or the like is obtained by the virtual steering wheel operation obtaining portion 15 via the touch panel Db and is then converted to the steering angle θ of the virtual steering wheel VS in S32. That is, when the driver slides his/her finger or the like on the virtual steering wheel VS to the right, the steering angle θ in the rightward direction (i.e., in the clockwise direction) is obtained. When the driver slides his/her finger or the like on the virtual steering wheel VS to the left, the steering angle θ in the leftward direction (i.e., in the counterclockwise direction) is obtained. The steering angle θ of the virtual steering wheel VS obtained in the aforementioned manner is sent to the auxiliary image controlling portion 14. The amount of operation relative to the virtual steering wheel VS may be input via the steering wheel S, or the like.

The auxiliary image controlling portion 14 that obtains the steering angle θ of the virtual steering wheel VS displays the virtual steering wheel VS based on the obtained steering angle θ and also displays the virtual wheels VW and the virtual expected rearward line 60v related to the virtual steering wheel VS in S33.

The aforementioned operation is repeated until an instruction to stop the interaction mode is provided in S34.

Accordingly, in the third embodiment, the driver operates the virtual steering wheel VS and then the virtual wheels VW and the virtual expected rearward line 60v are generated in association with the virtual steering wheel VS operated by the driver. Consequently, the driver may easily understand the meaning of the expected rearward line 60.

Each of the aforementioned first to third embodiments is applicable to the parking assist apparatus mounted at the vehicle so as to display the parking assist image in which the estimated course lines generated in association with the operation of the steering wheel is superimposed on the captured image of the surrounding of the vehicle.

According to the aforementioned embodiments, the auxiliary image including the virtual vehicle VV and the virtual expected rearward line 60v are displayed in place of the parking assist image. That is, the auxiliary image clearly indicates a positional relationship between the vehicle and the expected rearward line 60. Therefore, the driver who sees the auxiliary image understands the meaning of the expected rearward line 60.

The auxiliary image controlling portion 14 displays the auxiliary image in a case where a predetermined operation is performed to request a display of the auxiliary image.

The display of the auxiliary image is conducted at any timing. In this case, in order not to disturb the driving operation, specifically, the parking operation of the driver, the display of the auxiliary image is desirably conducted when requested by the driver. As a result, the auxiliary image is displayed only when requested by the driver, which restrains the driving operation of the driver from being disturbed.

The auxiliary image controlling portion 14 displays the virtual steering wheel VS on the display portion Da as a motion picture to indicate a change in a steering angle of the steering wheel S, and displays the virtual expected rearward line 60v generated in association with a change in a steering angle of the virtual steering wheel VS.

The virtual steering wheel is displayed on the auxiliary image. In addition, the virtual expected rearward line 60v is generated and changed in association with the change of the steering angle of the virtual steering wheel VS. Thus, the driver understands that the change of the expected rearward line 60 is related to the steering angle of the steering wheel VS. The meaning of the expected rearward line 60 is further understandable by the driver accordingly.

The auxiliary image controlling portion 14 displays the virtual wheel VW representing a front wheel of the vehicle, an operation of the virtual wheel VW being related to the change in the steering angle of the virtual steering wheel VS.

The display of the virtual wheels VW may be desirable so as to help the understanding of the driver.

The parking assist apparatus further includes the virtual steering wheel operation obtaining portion 15 obtaining the amount of operation relative to the virtual steering wheel VW. The auxiliary image controlling portion 14 displays the virtual steering wheel VW based on the amount of operation obtained by the virtual steering wheel operation obtaining portion 15.

Accordingly, the interaction relative to the virtual steering wheel VS is available. In a case where the driver operates the virtual steering wheel VS, the virtual expected rearward line 60v is changed on a basis of the amount of operation relative to the virtual steering wheel VS (i.e., the steering angle of the virtual steering wheel VS). Thus, the driver intuitively understands that the expected rearward line 60 is related to the steering wheel S. In addition, when the actual steering angle of the steering wheel S is obtained as the steering angle of the virtual steering wheel VS, the virtual expected rearward line 60v matches the expected rearward line 60, which leads to the further understanding of the driver.

The auxiliary image controlling portion 14 displays an image gradually changing from the auxiliary image to an image indicating a state where the parking assist image is displayed on the display portion Da in a case where the display of the auxiliary image is finished.

Because the auxiliary image is gradually changed to the parking assist image at the end of the auxiliary image, the switching of the image is seamlessly conducted. The uncomfortable feeling caused by the switching from the auxiliary image to the parking assist image may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parking assist apparatus comprising:
a display portion mounted at a vehicle and displaying a parking assist image in which an estimated course line generated in association with an operation of a steering wheel is superimposed on a captured image of a surrounding of the vehicle; and
an auxiliary image controlling portion displaying an auxiliary image in place of the parking assist image in a state where the parking assist image is displayed on the display portion, the auxiliary image including a virtual vehicle representing the vehicle and a virtual estimated course line corresponding to the estimated course line for the virtual vehicle, wherein
the auxiliary image controlling portion displays a virtual steering wheel on the display portion as a motion picture to indicate a change in a steering angle of the steering wheel, and displays the virtual estimated course line generated in association with a change in a steering angle of the virtual steering wheel, and wherein in a case where a movement of the vehicle is detected a controlling portion cancels the display of the auxiliary image and displays the parking assist image on the display portion.

2. The parking assist apparatus according to claim 1, wherein the auxiliary image controlling portion displays the auxiliary image in a case where a predetermined operation is performed to request a display of the auxiliary image.

3. The parking assist apparatus according to claim 1, wherein the auxiliary image controlling portion displays a virtual front wheel representing a front wheel of the vehicle, an operation of the virtual front wheel being related to the change in the steering angle of the virtual steering wheel.

4. The parking assist apparatus according to claim 2, wherein the auxiliary image controlling portion displays a virtual front wheel representing a front wheel of the vehicle, an operation of the virtual front wheel being related to the change in the steering angle of the virtual steering wheel.

5. The parking assist apparatus according to claim 1, further comprising a virtual steering wheel operation obtaining portion obtaining an amount of operation relative to the virtual steering wheel, wherein the auxiliary image controlling portion displays the virtual steering wheel based on the amount of operation obtained by the virtual steering wheel operation obtaining portion.

6. The parking assist apparatus according to claim 2, further comprising a virtual steering wheel operation obtaining portion obtaining an amount of operation relative to the virtual steering wheel, wherein the auxiliary image controlling portion displays the virtual steering wheel based on the amount of operation obtained by the virtual steering wheel operation obtaining portion.

7. The parking assist apparatus according to claim 3, further comprising a virtual steering wheel operation obtaining portion obtaining an amount of operation relative to the virtual steering wheel, wherein the auxiliary image controlling portion displays the virtual steering wheel based on the amount of operation obtained by the virtual steering wheel operation obtaining portion.

8. The parking assist apparatus according to claim 4, further comprising a virtual steering wheel operation obtaining portion obtaining an amount of operation relative to the virtual steering wheel, wherein the auxiliary image controlling portion displays the virtual steering wheel based on the amount of operation obtained by the virtual steering wheel operation obtaining portion.

9. The parking assist apparatus according to claim 1, wherein the auxiliary image controlling portion displays an image gradually changing from the auxiliary image to an image indicating a state where the parking assist image is displayed on the display portion in a case where the display of the auxiliary image is finished.

10. The parking assist apparatus according to claim 2, wherein the auxiliary image controlling portion displays an image gradually changing from the auxiliary image to an image indicating a state where the parking assist image is displayed on the display portion in a case where the display of the auxiliary image is finished.

11. The parking assist apparatus according to claim 3, wherein the auxiliary image controlling portion displays an image gradually changing from the auxiliary image to an image indicating a state where the parking assist image is displayed on the display portion in a case where the display of the auxiliary image is finished.

12. The parking assist apparatus according to claim 4, wherein the auxiliary image controlling portion displays an image gradually changing from the auxiliary image to an image indicating a state where the parking assist image is displayed on the display portion in a case where the display of the auxiliary image is finished.

13. The parking assist apparatus according to claim 5, wherein the auxiliary image controlling portion displays an image gradually changing from the auxiliary image to an image indicating a state where the parking assist image is displayed on the display portion in a case where the display of the auxiliary image is finished.

14. The parking assist apparatus according to claim 6, wherein the auxiliary image controlling portion displays an image gradually changing from the auxiliary image to an image indicating a state where the parking assist image is displayed on the display portion in a case where the display of the auxiliary image is finished.

15. The parking assist apparatus according to claim 7, wherein the auxiliary image controlling portion displays an image gradually changing from the auxiliary image to an image indicating a state where the parking assist image is displayed on the display portion in a case where the display of the auxiliary image is finished.

16. The parking assist apparatus according to claim 8, wherein the auxiliary image controlling portion displays an image gradually changing from the auxiliary image to an image indicating a state where the parking assist image is displayed on the display portion in a case where the display of the auxiliary image is finished.

* * * * *